US012689423B2

(12) United States Patent
Levi D'ancona et al.

(10) Patent No.: US 12,689,423 B2
(45) Date of Patent: Jul. 21, 2026

(54) ARRAY ANTENNA

(71) Applicant: BELLANTENNA S.R.L., Milan (IT)

(72) Inventors: Vito Levi D'ancona, Brookline, MA
(US); Richard Hammond Mayo,
Brixham (GB)

(73) Assignee: BELLANTENNA S.R.L., Milan (IT)

( * ) Notice: Subject to any disclaimer, the term of this
patent is extended or adjusted under 35
U.S.C. 154(b) by 302 days.

(21) Appl. No.: 18/560,825

(22) PCT Filed: Aug. 20, 2021

(86) PCT No.: PCT/IB2021/057679
§ 371 (c)(1),
(2) Date: Nov. 14, 2023

(87) PCT Pub. No.: WO2022/238742
PCT Pub. Date: Nov. 17, 2022

(65) Prior Publication Data
US 2024/0291542 A1 Aug. 29, 2024

(30) Foreign Application Priority Data

May 14, 2021 (IT) ........................ 102021000012467

(51) Int. Cl.
*H04B 7/06* (2006.01)
(52) U.S. Cl.
CPC ......... *H04B 7/0632* (2013.01); *H04B 7/0617*
(2013.01)
(58) Field of Classification Search
CPC .............................. H04B 7/0632; H04B 7/0617
USPC ........................................................ 455/507
See application file for complete search history.

(56) References Cited

U.S. PATENT DOCUMENTS

| | | | | |
|---|---|---|---|---|
| 10,651,920 B1* | 5/2020 | Struhsaker | ........... | H04B 7/0469 |
| 2016/0165472 A1* | 6/2016 | Gopalakrishnan | .... | H04W 24/10 |
| | | | | 455/67.11 |
| 2017/0195893 A1 | 7/2017 | Lee et al. | | |
| 2018/0323834 A1 | 11/2018 | Jiang et al. | | |

FOREIGN PATENT DOCUMENTS

EP 3787199 A1 3/2021

OTHER PUBLICATIONS

Thales: "Other RAN1 aspects for NR NTN", 3GPP Draft; RI-2006678,
3rd Generation Partnership Project (3GPP), Mobile Competence
Centre ; 650, Route Des Lucioles ; F-06921 Sophia-Antipolis Cedex
;France vol. RAN WG1, No. e-Meeting; Aug. 17, 2020-Aug. 28,
2020 Aug. 7, 2020 (Aug. 7, 2020.

* cited by examiner

*Primary Examiner* — Eugene Yun
(74) *Attorney, Agent, or Firm* — FisherBroyles, LLP;
Roger L. Browdy; James E. Mrose

(57) ABSTRACT

An array antenna of arbitrary shape configured to establish
a communication link with a subscriber device based on a
radio signal defined by a plurality of radio waves comprises
a plurality of antenna elements (1a), a sensor and a control
unit. Each antenna element (1a) is configured to transmit/
receive a respective radio wave according to a respective set
of working parameters and the sensor is configured to
acquire at least one operational parameter identifying a
transmission quality of the radio signal. The control unit can
be operated to vary at least one working parameter of at least
one antenna element (1a) based on the at least one opera-
tional parameter.

16 Claims, 1 Drawing Sheet

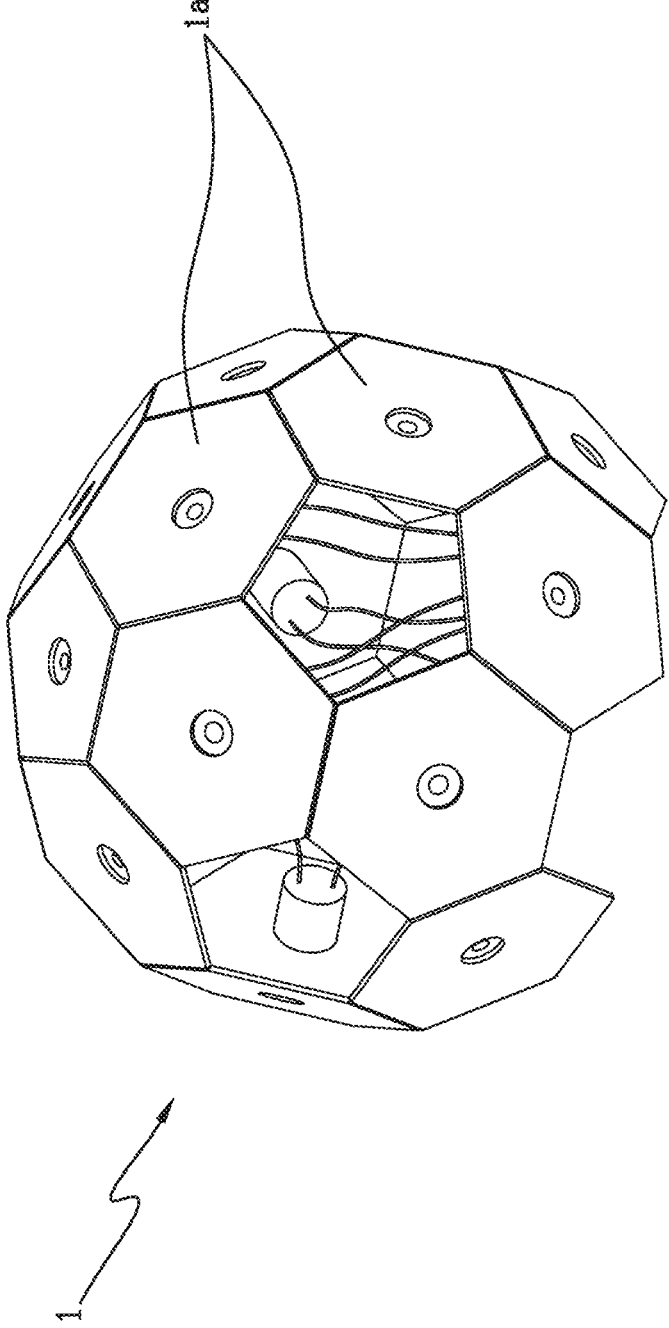

ARRAY ANTENNA

TECHNICAL FIELD

The present invention relates to the technical field of telecommunication devices.

In particular, the present invention relates to an array antenna which comprises a plurality of antenna elements each configured to transmit a respective radio waves that contributes to define the radio signal produced by the array antenna.

More in particular, the present invention is directed to an array antenna that may be used in terrestrial network infrastructure for communications to mobile phones or other connected devices and to a method for optimizing communication parameters to connected devices from array antennas of arbitrary shapes.

BACKGROUND ART

The telecommunication industry is currently designing phase array antennas to optimize the beam-steering parameters for each of its individual antenna elements, so that the array can create and steer one or more beams of radio waves to different directions in a covered area.

The current trend is to design networks with a large number of multiple-input, multiple-output, or massive MIMO antennas to focus radiated power into ever smaller regions of space to bring improvements in throughput and radiated energy efficiency.

The same array antenna is usually used for both communication to and from a device, e.g. a mobile phone.

At present, the same parameters having been optimised for reception are used for transmission. Because of limitations of the transmitter electronics, particularly when it comes to dealing with several signals at once destined for different destinations, this approach results in sub-optimum performance.

Moreover, the telecommunication industry is currently adopting flat phased array antennas to project narrow beams to the various subscribers' equipment so that the same frequencies may be used for multiple subscribers without mutual interference. A current trend in the telecommunication industry is to deploy antennas with large number of narrow beams. In a communication network, individual MIMO antennas receive signals from subscribers entering areas covered by each individual antenna.

Each MIMO antenna deduces the assumed position of each individual subscriber in the covered area, by analysing the signal received by each subscriber according to certain signal parameters.

Each MIMO antenna transmit back signals to the individual subscribers with beam pointing to their individual assumed position in the covered area.

The assumptions that the position of a subscriber relative to a MIMO antenna corresponds to the computed direction obtained by optimizing the signals received by such subscriber is however problematic.

Such assumption may be valid in an ideal environment with no interreference, multipath, or obstacles and with theoretically perfect electronics with entirely linear characteristics over time and environmental conditions.

In a cluttered urban environment, however, signals do not propagate in a straight from antennas to subscribers. Signals may be influenced by multipath effects, obstacles, obstructions, interferences, changes in orientation, changes in weather conditions, or changes in the performance of the electronics of devices and antennas etc.

These influencing factors cause the positioning vector that the antenna established to transmit towards not to be the vector which is best for transmission. In the case there is no line of sight between the phased array antenna and the device(s), the transmit beam not necessarily provides the desired coverage to the devices.

In other words, traditional approaches optimize the beam-steering characteristics of each individual antenna element but fail to take into account the actual transmission quality of the communication that is established with subscriber devices to which the antenna array transmit.

DISCLOSURE OF THE INVENTION

In this context, the technical purpose which forms the basis of this invention is to provide an array antenna which overcomes at least some of the above-mentioned drawbacks of the prior art.

In particular, the aim of the invention is to provide an array antenna capable of optimal performances in most urban circumstances or cluttered environment.

The technical purpose indicated and the aims specified are substantially achieved by an array antenna comprising the technical features described in one or more of the appended claims.

The invention describes an array antenna configured to establish a communication link with a subscriber device.

The communication link is based on a radio signal defined by a plurality of radio waves.

Structurally the antenna comprises essentially a plurality of antenna elements, at least one sensor and a control unit.

Each antenna element is configured to transmit or receive a respective radio wave according to a respective set of working parameters. Altogether the radio waves transmitted and received by the various antenna elements contribute to define the radio signal.

Each sensor is configured to acquire at least one operational parameter, which identifies a transmission quality of the radio signal.

The control unit at the antenna is configured to vary at least one working parameter of at least one antenna element based on the at least one operational parameter.

BRIEF DESCRIPTION OF DRAWINGS

Further features and advantages of this invention are more apparent in the detailed description below, with reference to a preferred, non-restricting, embodiment of an array antenna as illustrated in the accompanying drawings, in which:

FIG. 1 represents a possible embodiment for the array antenna.

DETAILED DESCRIPTION OF PREFERRED EMBODIMENTS OF THE INVENTION

In the accompanying drawings, the numeral 1 denotes the array antenna according to the invention, which will be indicated below as antenna 1.

In particular, the antenna is configured to establish a communication link with a subscriber device based on a radio signal defined by a plurality of radio waves.

In other words, the antenna is meant to transmit and receive a radio signal to and from a subscriber device which could be for example a smartphone or any other kind of devices able to communicate through radio waves.

According to an aspect of the present invention, the antenna is configured to establish the communication link with the subscriber device only after said subscriber device explicitly authorizes and/or requests the establishment of the communication link.

In fact, another problem faced in this field derives from consumer concerns of perceived health hazard due to excessive signal power deriving from the use of telecommunication devices.

The antenna 1 according to the present invention addresses such consumer concern by making the establishment of the communication link between the antenna and the subscriber device conditional on the willingness of the user, thus, for example, allowing the concerned subscriber to turn their devices off in order to limit the energy received from the proposed antenna 1.

In general, the proposed antenna 1 is conceived to optimize the communication links assuming that the user wants an optimized signal, if however, such assumption is not valid and certain users do not want the antenna 1 to transmit signals towards them, the establishment of the communication link can be limited in time.

In addition, in any location where active subscriber devices are not present, the amount of signal power transmitted by the antenna array is automatically minimized so as to reduce unwanted interference with any devices which are not or are not intended to be part of the network, or people who have no interest in the service.

Structurally, the antenna 1 comprises a plurality of antenna elements 1a, a sensor and a control unit.

Each antenna element 1a is configured to transmit and receive a respective radio wave of the plurality of radio waves that collectively form the radio signal and preferably comprises at least one of a patch element or a dipole.

Moreover, the antenna elements 1a can be pointing in any arbitrary directions from any arbitrary positions. Such positions can change over time and conditions and can be of arbitrary shape, for example a flat panel the sensor in each antenna 1 assesses the overall quality of the communication link established between the antenna 1 and the subscriber device by acquiring information pertaining the transmission quality of the radio signal from and to the subscriber device.

Operatively, the sensor can be linked to one or more acquisition unit and/or devices and/or control unit of the subscriber devices which measures the transmission quality of the signal received by the antenna and transmit such information to the sensor.

In particular, the sensor and/or the control unit of the antenna 1 can cause the subscriber device to send an information containing the at least one operational parameter.

Furthermore, the antenna elements 1a can contribute to define an external surface of the antenna 1 (while the other components of the antenna 1 may be positioned inside the chamber enclosed by this external surface).

For example, the antenna elements 1a may define an external surface presenting a spheroidal or cylindrical shape.

Furthermore, the antenna elements 1a may be positioned to follow the shape of a building or a statue or any other kind of architectural structure.

The distribution and thus the shape of the external surface of the antenna 1 may also change over time due to mechanical changes in the composition or position or the antenna elements 1a, or due to movements induced by environmental changes or by the necessity deriving from the specific properties of the communication link that need to be established.

In general, the antenna 1 is conceived to operate with any arbitrary number of antenna elements 1a and they can be pointing in arbitrary directions from arbitrary positions: for example, antenna elements 1a may be arbitrary placed on the faces of a truncated icosahedron and each antenna element 1a may be connected to the control unit in no particular pre-defined order.

More in detail, each antenna element 1a transmit and receive the respective radio wave according to a respective set of working parameters.

In particular, the working parameters comprise transmission and reception parameters that determine how the antenna elements 1a transmit and receives radio waves.

The transmission parameters determine how each antenna elements 1a emit a radio wave and the reception parameters determine how each antenna elements 1a receive a radio wave.

In other words, each antenna element 1a is meant to manage (i.e. receive and/or transmit) a radio wave according to a specific set of instruction or parameters and the sum of all the radio waves processed by the various antenna elements 1a that form part of the antenna 1 defines the radio signal.

According to an aspect of the present invention, the set of working parameters can comprise at least a phase of the radio wave from an antenna element 1a.

The sensor is configured to acquire at least one operational parameter, which identifies a transmission quality of the radio signal.

In the present description, the expression "transmission quality" is meant to identify an overall quality of the communication link that is established between the antenna 1 and a subscribed device and is not limited only to measure the quality of the radio signal that is transmitted by the antenna 1 to the subscriber devices, but also encompass the quality of the radio signal transmitted by the subscriber devices to the antenna 1.

Specifically, the "transmission quality" comprises a quality of the signal emitted by the antenna 1 as the same is received by a subscriber device and/or the quality of the signal received by the antenna 1 itself.

In other words, the transmission quality is meant to be a measure of how well the element that concur to establish the communication link emit radio signal and how well said signal are received by the other involved elements.

Consequently, the sensor is tasked with the identification of the quality of the communication link that is established with the subscriber device, by measuring and thus acquiring at least one parameter that can be used to infer how well radio signals are transmitted and received to and from the subscriber device.

In particular, the at least one operational parameter comprises at least one of a signal strength, a bit error rate or a polarization of the signal.

In use the operational parameter can be measured by the sensor either at the antenna 1 or at the subscriber device.

The above means that the at least one operational parameter can be representative of the transmission quality of the transmitted radio signal as received by the subscriber device and/or of the transmission quality of the transmitted radio signal as received by the antenna from a subscriber device.

In fact, the sensor in each antenna 1 assesses the overall quality of the communication link established between the antenna 1 and the subscriber device by acquiring information pertaining the transmission quality of the signal received by the antenna and/or the transmission quality of signal received by the subscriber device.

Preferably, the antenna 1 comprises at least two sensors, even more preferably just two sensors, wherein a first sensor is specifically configured to acquire at least one operational parameter which identifies a transmission quality of the radio signal from one or more subscriber devices and a second sensor is specifically configured to acquire at least one operational parameter which identifies a transmission quality of the radio signal to one or more subscriber devices.

In other words, the antenna comprises two distinct sensors to acquire the information necessary to assess the transmission quality of the radio signal: one monitors the signals as they are received by the antenna and the other monitors the signal as they are received by the subscriber devices.

In particular, the second sensor is meant and configured to receive from the subscriber devices a signal, preferably generated by the subscriber devices themselves, that identifies and reports to the antenna 1 the transmission quality of the radio signals that have been received by the subscriber devices from the antenna 1.

The operational parameter acquired by the sensor can then be used to manage the antenna 1 itself.

In particular, the control unit is configured to vary at least one working parameter of at least one antenna element 1a based on the at least one operational parameter.

It derives that the control unit can control the functioning of each antenna elements 1a in order to finely tune its interaction with the radio signal by modifying the set of parameters according to which each single radio wave is managed.

In particular, the control unit is configured to vary the working parameters of the antenna elements 1a until an optimal quality for the communication link is obtained. In other words, the control unit keeps varying the set of working parameters of the antenna elements 1a until the operational parameter acquired through the sensor identifies a maximum obtainable transmission quality for the radio signal.

In fact, the control unit processes the operational parameter and varies the working parameters in a closed feedback loop with a subscriber device in order to obtain the most optimal communication link both ways between the antenna 1 and the subscriber device.

In other words, the antenna 1 according to the present invention allows to optimize the signals that are transmitted to and from the antenna 1 itself, by communicating with the subscriber device so as to acquire information concerning the quality of the communication link that is established between them.

More in detail, the control unit is configured to manage the transmission parameters independently from the reception parameters and vice versa, meaning that the control unit can vary and select both the transmission parameters that optimize the transmission of radio waves and the reception parameters that optimize the reception of radio waves.

In this context the transmission parameters may be varied by the control unit to be different from the reception parameters if such configuration determines an improvement of the overall quality of the communication link.

According to an aspect of the present invention, the control unit is configured to vary the at least one working parameter of each antenna element 1a individually and independently from the set of working parameters of each other antenna element 1a.

Preferably, when the control unit changes the at least one working parameter of at least one antenna element 1a each other antenna elements 1a continue to manage the respective radio wave according to the previous working parameters.

Advantageously, differently from known array antennas, the antenna 1 according to the present invention allows to adjust each antenna element 1a in turn by varying its set of working parameters while all the other antenna elements 1a continue to operate according to the respective set of working parameters, which in that specific moment are not affected by the optimization carried out by the control unit.

Advantageously, the antenna 1 according to the present invention allows to solve the problem known from the prior art insofar it provides a clear and efficient way to optimize the communication link between the antenna 1 and one or more subscriber devices.

The invention also relates to a telecommunication method that can be advantageously performed by an antenna 1 comprising on or more of the technical features described above.

In particular, the method is performed by transmitting and/or receiving via the antenna elements 1a a plurality of radio waves defining a radio signal to establish and maintain a communication link with a subscriber device.

In other words, a communication link is established between the antenna 1 and the subscriber device through a radio signal that is defined by the superimposition of a plurality of radio waves, each one processed by a distinct antenna element 1a and according to a specific set of working parameters.

Preferably the method further comprises a step of requiring and/or authorizing the establishment of the communication link to be performed by the subscriber device.

In other words, as explained above the establishment of the communication link may be made conditional on the acknowledgement of the same by the user.

Once the communication link is established, the method comprises a step of periodically and frequently acquiring at least one operational parameter, wherein the at least one operational parameter identifies the overall quality of the radio signal transmitted to or from the subscriber device.

The at least one operational parameter can be used to determine the optimal set of working parameters for each antenna element 1a that allows to maximize the transmission quality of the communication link.

In particular, the method comprises a step of varying at least one working parameter of at least one antenna element 1a based on the at least one operational parameter.

Specifically, the method is performed by varying the transmission parameters and the reception parameters of the antenna elements 1a independently from each other.

According to a possible embodiment, the variation of the working parameter can be performed by varying in turn the phase value and/or the polarization of the antenna element 1a relative to the phase of the radio signal.

The variation is performed by increasing the selected working parameter of a preset value, even more preferably the preset value corresponds to 90 degrees.

Operatively the operational parameter for each antenna element 1a is individually acquired when its phase value is set to 0 degrees, 90 degrees and 180 degrees and then the obtained values are interpolated.

In detail, the obtained data are interpolated in such a way as to generate a sinusoidal function expressed as a function of the phase value.

At this point the optimization of the communication link is obtained by selecting for each antenna element 1a a phase value corresponding to a maximum/optimal value of the sinusoidal function that has been generated when interpolating the operational parameter acquired for that specific antenna element 1a.

In particular, the optimal value can be found applying the formula $P=90-a \tan 2(2*R_{90}-R_0-R_{180}, R_0-R_{180})$, wherein P represent the value of the optimal working parameter and $R_x$ represents the value of the operational parameter obtained when the working parameter is set to x degrees.

If and when the value of P that is obtained through the above procedure is more than zero, then the working parameter of the antenna element $1a$ is set to P, otherwise the working parameter of the antenna element $1a$ is set to P+360 degrees.

It is observed that the above identified interpolation procedure represents a preferred embodiment which is particularly efficient and easily implemented, but in principle other analogous interpolation procedure may be implemented.

As indicated, the above procedure is performed for each antenna element $1a$, meaning that once the transmission quality for the radio signal based on the performances of a specific antenna element $1a$ is obtained the control unit proceeds to command in an analogous and corresponding way the phase of the radio wave of a different antenna element $1a$ and the procedure is repeated for each antenna element $1a$ of the antenna 1 continually, ensuring that optimal/maximum transmission quality is obtained and maintained.

It is underlined that the above procedure is continually performed as long as the communication link is maintained, in other words as long as the antenna 1 is coupled to the subscriber device.

Consequently, the described method allows a continuous optimization of the communication link established between the antenna 1 and the subscriber device.

In general, the method may be performed starting from any set of working parameters, but preferably the method further comprises a setting step in which a starting set of the working parameters for each antenna element $1a$ is selected.

In particular, the starting set of working parameters is selected by setting the phase value of the antenna elements to 0 degrees.

It is also an object of the present application a telecommunication network that comprises a plurality of array antenna 1 presenting one or more of the technical features described above.

In particular, the antennas 1 may present identical, similar or different shapes (i.e. their respective antenna elements $1a$ are reciprocally interconnected in different ways) and may be positioned in different places inside an area where the telecommunication network is meant to provide coverage for the transmission of radio signal to and from any number of subscriber devices.

As an example, the telecommunication network may be meant to provide coverage inside a town square and the array antennas 1 may be applied/installed on respective streetlights and/or their antenna elements $1a$ may be configured to define respective surfaces that follow the shape of a building or a statue or any other kind of architectural structure in the town square so as to reduce at a minimum the influence of the telecommunication network over the general aesthetic of the town square.

The telecommunication network further comprises a central control unit configured to acquire the least one operational parameter of each array antenna 1 and to vary at least one working parameter of at least one antenna elements $1a$ of at least one array antenna 1 based on the corresponding operational parameter.

In other word the central control unit acquire information concerning each array antenna 1 forming the telecommunication network and is able to control the variation of their working parameter.

Consequently, the central control unit allows to vary the working parameter of a specific array antenna 1 while taking into account also the operational parameter of each other array antenna 1.

In this way the telecommunication method described above may be performed in such a way that the transmission/reception of the radio signal is optimized for each array antenna 1 of the telecommunication network taking also and in particular into account the interactions between the array antennas 1.

Advantageously the central control unit may be at least partially defined by the sensor and the control unit of one array antenna 1.

The above means that one array antenna 1 of the telecommunication network may be equipped with a sensor and a control unit that are specifically configured, adapted, designed to operate as a central control unit for the whole telecommunication network.

Alternatively, the central control unit may be an independent and autonomous component of the telecommunication network.

The invention claimed is:

1. An antenna having an array of individual antenna elements arranged in an arbitrary shape to form the antenna, the array of individual antenna elements being configured to establish a communication link with one or more identifiable subscriber devices based on a radio signal defined by a plurality of radio waves, said antenna comprising:

the array of individual antenna elements, each individual antenna element being configured to transmit and receive a respective radio wave of said plurality of radio waves according to a respective set of working parameters;

a sensor configured to acquire at least one operational parameter, said at least one operational parameter identifying a transmission quality of the radio signal from one or more identifiable subscriber devices to the antenna and/or from the antenna to one or more identifiable subscriber devices, the transmission quality being a measure of how well the one or more identifiable subscriber devices emit a radio signal and how well the radio signal is received by the antenna, and/or a measure of how well the antenna emits a radio signal and how well the radio signal is received by the one or more identifiable subscriber devices;

a control unit configured to vary at least one working parameter of each antenna element based on the at least one operational parameter individually and independently of working parameters of each other antenna element, where the sum of all radio waves processed by the antenna elements defines the radio signal of the antenna.

2. The antenna according to claim 1, wherein the operational parameter comprises at least one of a signal strength, a bit error rate or a polarization of the signal received by the identifiable subscriber device.

3. The antenna according to claim 1, wherein said antenna elements comprise at least one of a patch element or a dipole.

4. The antenna according to claim 1, configured to establish a communication link with the one or more subscriber devices only after said subscriber devices explicitly authorize and/or request the establishment of the communication link.

5. The antenna according to claim 1, wherein the at least one operational parameter is representative of the transmission quality of the radio signal transmitted by the antenna as received by the subscriber device.

6. The antenna according to claim 1, wherein the at least one operational parameter is representative of the transmission quality of the radio signal as received by the antenna.

7. The antenna according to claim 1, wherein the set of working parameters comprises at least a phase of the radio wave.

8. The antenna according to claim 1, wherein the control unit is configured to vary the at least one working parameter of each antenna element successively.

9. The antenna according to claim 1, wherein when the control unit changes the at least one working parameter of at least one antenna element each other antenna element continues to transmit or receive the respective radio wave according to the respective set of working parameters.

10. The antenna according claim 1, wherein each antenna element defines a portion of an external surface of the antenna.

11. The antenna according to claim 10, wherein the external surface is flat or has a spheroidal or cylindrical or a truncated icosahedron shape or is positioned to follow the shape of a building or a statue or any other kind of architectonical structure.

12. The antenna according to claim 1, wherein the set of working parameters comprises transmission parameters and reception parameters, said plurality of antenna elements being configured to transmit respective radio wave according to the transmission parameters and to receive respective radio waves according to the reception parameters, said control unit being configured to vary the transmission parameters independently from the reception parameters and vice versa.

13. A telecommunication method to be performed by an antenna according to claim 1, wherein the method comprises the step of:

a) transmitting or receiving via the plurality of antenna elements a plurality of radio waves defining a radio signal configured to establish and maintain a communication link with a subscriber device;

b) acquiring at least one operational parameter, said at least one operational parameter identifying a transmission quality of the radio signal from and to one or more identifiable subscriber devices;

c) varying at least one working parameter of each antenna element based on the at least one operational parameter individually and independently of working parameters of each other antenna element, where the sum of all radio waves processed by the antenna elements defines the radio signal of the antenna;

optionally said steps b) and c) being continuously or periodically performed as long as the communication link is maintained.

14. The method according to claims 13, wherein step c) is performed by:

successively for each antenna element, setting a working parameter of the antenna element comprising at least one between a phase value or a plane of polarization of the antenna element to 0 degrees, 90 degrees and 180 degrees in succession;

acquiring the at least one operational parameter when the working parameter of the antenna element is equal to 0 degrees, 90 degrees and 180 degrees in succession;

interpolating the acquired operational parameters generating a sinusoidal function expressed as a function of the working parameter value;

and the method further comprises a step of selecting for said antenna element the working parameter corresponding to a maximum value of the sinusoidal curve.

15. A telecommunication network comprising:

a plurality of the array antenna according to claim 1;

a central control unit configured to acquire the least one operational parameter of each array antenna and to vary at least one working parameter of at least one antenna elements of at least one array antenna based on the corresponding operational parameter.

16. The telecommunication network according to claim 15, wherein the central control unit is at least partially defined by the sensor and the control unit of one array antenna.

* * * * *